(12) United States Patent
Litwiller et al.

(10) Patent No.: US 6,977,595 B2
(45) Date of Patent: Dec. 20, 2005

(54) MULTI-DEVICE INTER-CONNECTION SECURING APPARATUS

(75) Inventors: Debora Margaret Hejza Litwiller, Rochester, NY (US); Philip E. Blair, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 957 days.

(21) Appl. No.: 10/045,368

(22) Filed: Nov. 9, 2001

(65) Prior Publication Data

US 2003/0103799 A1 Jun. 5, 2003

(51) Int. Cl.[7] .............................................. G08B 21/00
(52) U.S. Cl. ...................................... 340/687; 403/11
(58) Field of Search .......................... 340/687, 656; 403/11, 381; 439/489, 490; 700/71, 19, 21

(56) References Cited

U.S. PATENT DOCUMENTS

| | | | | |
|---|---|---|---|---|
| 4,290,662 A | * | 9/1981 | Storcel | 439/320 |
| 5,524,463 A | * | 6/1996 | Schenkel et al. | 70/57.1 |
| 6,561,841 B2 | * | 5/2003 | Norwood et al. | 439/489 |
| 2002/0022397 A1 | * | 2/2002 | Hillman et al. | 439/489 |

* cited by examiner

Primary Examiner—Phung T. Nguyen

(57) ABSTRACT

A system for the secure physical attachment of a second device to a first device is disclosed comprising a first and second inter-connection attachment means in physical association with each device. The second inter-connection attachment means physically mates with its corresponding first inter-connection attachment means. Additionally, means for detecting the physical mating of each of the first and second inter-connection attachment means is provided. The detecting means is preferably associated with at least one of the devices and in communication with each of it's associated device's inter-connection attachment means. Means are provided for determining that the first and second inter-connection attachment means have been securely mated and, if not, means are provided for indicating the status of the completion of the secure attachment there between. A controller is used for halting at least one of the devices in the event that the attachment there between has not been secured and for receiving additional instructions from an end-user.

20 Claims, 4 Drawing Sheets

MULTI-DEVICE INTER-CONNECTION SECURING APPARATUS

FIELD OF THE INVENTION

This invention is related to apparatus for interlocking devices together and, more particularly, to interlocking apparatus devices which can notify a user as to whether or not the inter-connected devices have been securely attached together.

BACKGROUND OF THE INVENTION

Often, it is necessary to physically attach one device to another as accessory apparatus or, in the case of copier machines, additional paper tray assemblies, document feeders and device stands, prior to the primary device's initialization and subsequent proper operation. In most instances, a machine is delivered to the end-user or customer with some assembly being required to be performed by the customer. It often times is not possible for the device manufacturer's technical representatives to be present to monitor and otherwise ensure that device attachment and installation has been performed properly in advance of the machine's operation. Incorrect assembly can cause damage to the machine and/or cause injury to the customer.

What is needed in the arts is a multi-device inter-connection apparatus with means by which the primary device can ascertain whether or not an attachment assembly has been securely attached prior to device activation.

SUMMARY OF THE INVENTION

What is disclosed is a multi-device inter-connection apparatus with means by which the primary device can ascertain whether or not an assembly has been securely attached prior to device activation.

In one embodiment, an apparatus is disclosed comprising a first and second mating portions, a plurality of sensors, and a securing means. A first mating portion physically attached to or otherwise made integral with a primary device and a second mating portion physically attaches to or is made integral with a secondary device both of which are intended to be physically and securely connected together. The first mating portion is specifically configured in a predefined geometric shape such that only correspondingly configured secondary devices can be mated therewith. The two mating portions collectively have means for locking the two devices together in order to secure the inter-connection thereof. Further, the first mating portion is configured such that a signal can be provided indicating that the inter-connection between the two mating devices has yet been secured. A controller is used for halting at least one of the devices in the event that the attachment there between has not been secured and for receiving additional instructions from an end-user.

In a second embodiment, an apparatus for the secure physical attachment of a second device to a first device is disclosed comprising a first and second inter-connection attachment means in physical association with each device. The second inter-connection attachment means physically mates with its corresponding first inter-connection attachment means with means for detecting the physical mating of each of the first and second inter-connection attachment means provided. The detecting means is preferably associated with at least one of the devices and in communication with each of it's associated device's inter-connection attachment means. Means are provided for determining that the first and second inter-connection attachment means have been securely mated. Means are also disclosed for indicating the status of the completion of the secure attachment there between. A controller is used for halting at least one of the devices in the event that the attachment there between has not been secured and for receiving additional instructions from an end-user.

Advantages of the present invention, as described herein, may be realized and otherwise obtained by means particularly pointed out and distinctly claimed in the appended claims, taken in conjunction with the accompanying drawings and detailed specification.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

What is disclosed is a multi-device inter-connection apparatus with means by which the primary device can ascertain whether or not a secondary device attachment assembly has been securely attached. What is disclosed is a multi-device inter-connection apparatus with means by which the primary device can ascertain whether or not an attachment assembly has been securely attached prior to device activation.

In one embodiment, an apparatus is disclosed comprising a first and second mating portions, a plurality of detecting sensors, and a securing means. A first mating portion physically attached to or otherwise made integral with a primary device and a second mating portion physically attached to or made integral with a secondary device both of which are intended to be physically and securely connected together. The first mating portion is specifically configured in a predefined geometric shape such that only correspondingly configured secondary devices can be mated therewith. The two mating portions collectively have at least one means for locking the two devices together in order to secure the inter-connection thereof. Further, the first mating portion is configured such that a signal or notice can be provided indicating that the inter-connection between the two mating devices has yet to been secured. A controller is used for halting at least one of the devices in the event that the attachment there between has not been secured and for receiving additional instructions from an end-user.

Figure 1:
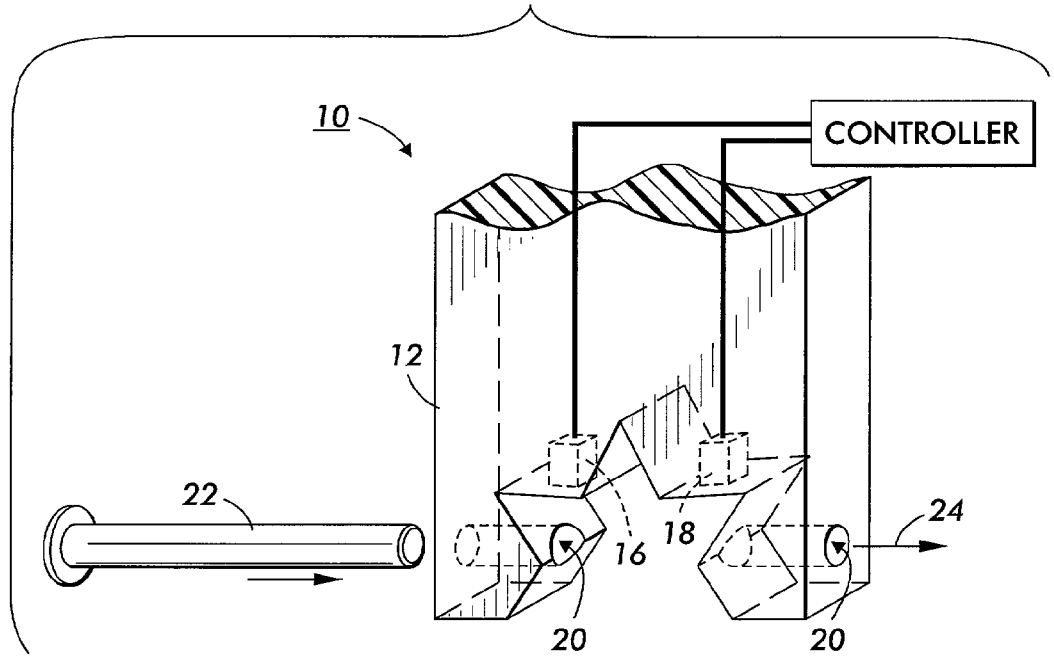
FIG. 1 illustrates a first half of the inter-connection apparatus of the present invention, shown integral to primary device 12, along with connection pin 22 and configured to have a geometric shape to restrict attachments to known devices with corresponding mating portions.

Attention is directed to FIG. 1 which illustrates, in one embodiment, half of the inter-connection apparatus 10 of the present invention integral to primary device 12. Inter-connection apparatus 10 comprises a pair of sensor means shown at 16 and 18. Although other sensor means are envisioned and considered within the scope of the present invention, in one embodiment and for discussion purposes herein, said sensor means 16 and 18 generally comprise open circuit means. In addition, inter-connection apparatus 10 comprises securing means, collectively illustrated at 20, which, in the embodiment of FIG. 1, is illustrated as a hole through which pin 22 passes along the path indicated at 24. Pin 22 is made of a conductive material which closes the electrical connection between open-circuit sensors 16 and 18. Note that sensors 16 and 18 are specifically configured in an open-circuit in order to take advantage of the conductivity properties of pin 22 through mating sensors integral to the secondary device, to electrically complete the connection between the two sensors.

It should be understood that sensors 16 and 18 are in electrical communication with the Controller of FIG. 1 which functions, in part, to monitor the sensors of the apparatus of the present invention in order to indicate that a secondary device has been secured. One skilled in the art would readily be able to make, purchase, or otherwise obtain a variety of sensor means made in electrical communication with said Controller of primary device 12 which, when said obtained sensors are configured in accordance with the teachings herein, form a composite of the apparatus of the present invention as illustrated generally in FIG. 1. It should be further understood that other embodiments of the present apparatus, in terms of a variety of sensor means and securing means, are envisioned herein and are to be considered within the scope of the present invention.

Figure 2:
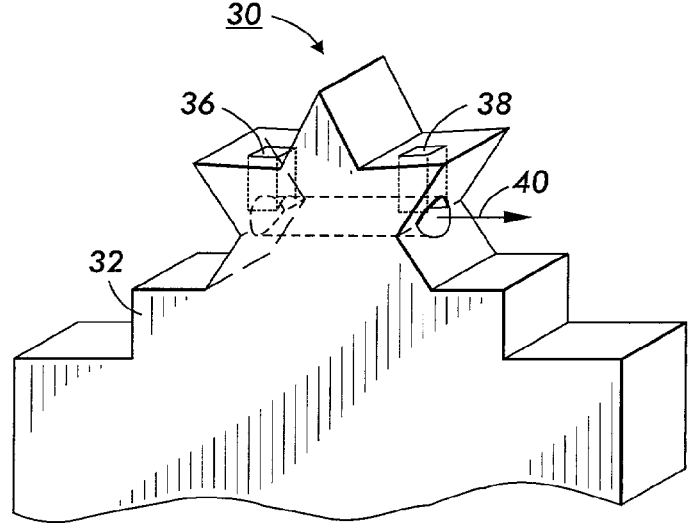
FIG. 2 illustrates a second half of the inter-connection apparatus of the present invention which is made integral to a secondary device intended to be physically attached to primary device 12 of FIG. 1 with a connection pin, specifically configured to have a mating geometric shape to the shape of the device of FIG. 1.

Attention is now directed to FIG. 2 which illustrates the second half of the inter-connection apparatus of the present invention, shown generally at 30, made integral to secondary device 32 intended to be physically attached to primary device 12 of FIG. 1. As will be discussed further herein, apparatus 30 of FIG. 2 is configured to mate securely with 10 of FIG. 1. It is important to note that the first device's attachment means shown in FIG. 1 is specifically configured in a geometric shape to only mate with a known secondary device having the inverse mating configuration, as is best illustrated in FIG. 2. In such a manner, the first device can only be connected to a specific and known secondary device. Thus, as shown in the illustration of FIG. 3, the detection of the securing pin alone indicates that a device is attached.

Apparatus 30 is configured with electrical conductivity means shown at 36 and 38 which provide an electrical communication pathway from the outer edge thereof down through to the hole which pin 22 of FIG. 1 passes, shown at 40, so as to come in contact with the conductivity properties of pin 22 such that an electrical circuit is completed there through.

Figure 3:
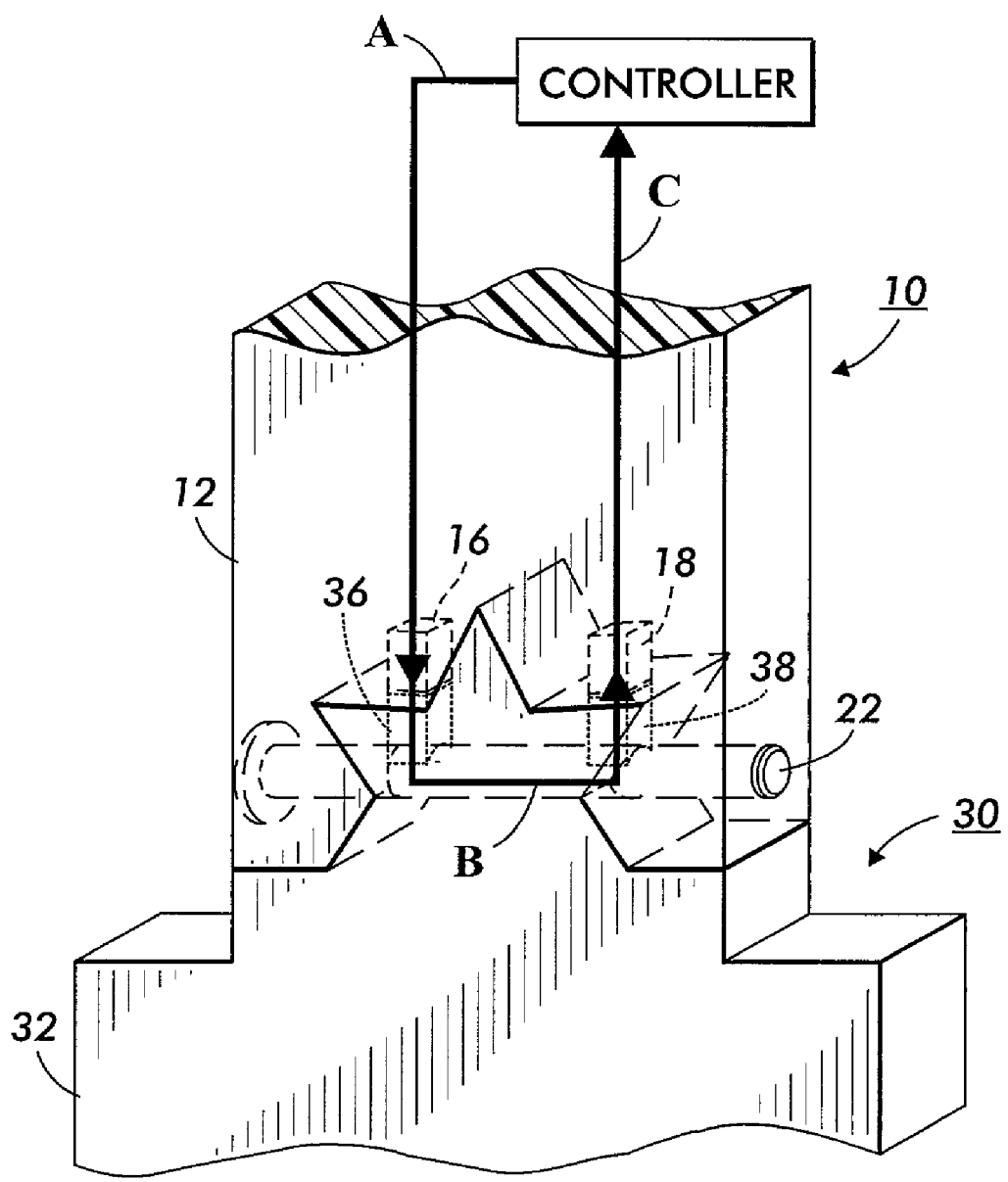
FIG. 3 showing the mating of device 12 of FIG. 1 with device 32 of FIG. 2, also illustrated is pin 22 securely physically connecting the two devices together.

Attention is now directed to FIG. 3 which illustrates the mating of device 12 of FIG. 1 with device 32 of FIG. 2. Securing pin 22 is shown inserted there between through the paths illustrated at 24 in FIG. 1 and at 40 in FIG. 2 thus physically connecting and securing the mated devices together. With the physical connection of the two pieces made, sensors 16 and 18 are brought in electrical communication with conductivity means 36 and 38 respectively. A closed circuit is enabled from path A through electrical conductivity means 36 down to and through electrically conductive pin 22, shown as path B, up through conductivity means 38, passing through the open-circuit sensor means 18 and back to the controller, shown as path C. It is important to understand that the embodiment illustrated herein takes advantage of the conductivity properties of pin 22 to close the circuit along path A to B to C of FIG. 3. In addition, it should be understood that the sensors and conductivity means, are electrically insulated, and thereby isolated from, the main bodies of devices 12 and 32.

In such a manner, a secondary device is connected to a primary device by the mating of the apparatus FIG. 2 with that of FIG. 1 and, thereafter, the electrically conductive pin gets inserted through both mating surfaces in order to physically secure the inter-connection there between. The primary device gains knowledge that the inter-connection between the two devices has been secured by the securing pin by the closed circuit completion between 16–36 and 18–38. If the controller detects that the securing pin has not be put into place, in the embodiment illustrated, the open-circuit does not close. A signal can be sent to a user interface (UI) or one or more commands can be initiated or activated by the controller to indicate that the physical attachment of the secondary device to the primary device has not been secured.

In a second embodiment, an apparatus for the secure physical attachment of a second device to a first device is disclosed comprising a first and second inter-connection attachment means in physical association with each device. The second inter-connection attachment means physically mates with its corresponding first inter-connection attachment means with means for detecting the physical mating of each of the first and second inter-connection attachment means provided. The detecting means is preferably associated with at least one of the devices and in communication with each of it's associated device's inter-connection attachment means. Means are provided for determining that the first and second inter-connection attachment means have been securely mated. Means are also disclosed for indicating the status of the completion of the secure attachment there between. A controller is used for halting at least one of the devices in the event that the attachment there between has not been secured and for receiving additional instructions from an end-user.

Figure 4:
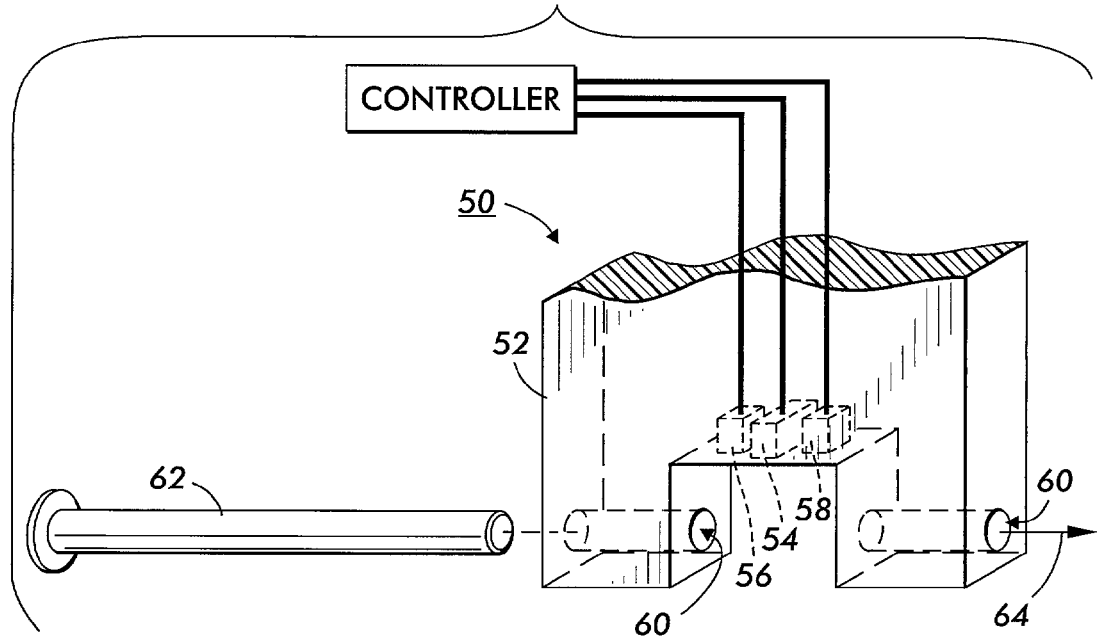
FIG. 4 illustrates a first half of the inter-connection apparatus of the present invention, which is shown integral to primary device 52, along with connection pin 62, further illustrating the addition of means 54 for detecting the presence of a secondary device.

Attention is directed to FIG. 4 which illustrates, in one embodiment, half of the inter-connection apparatus 50 of the present invention integral to primary device 52. The inter-connection apparatus 50 comprises a first sensor means 54 to detect the presence of the physical attachment of the secondary device. Inter-connection apparatus 50 further comprises a pair of secondary sensor means shown at 56 and 58. Although other sensor means are envisioned and considered within the scope of the present invention, in one embodiment and for discussion purposes herein, first sensor means 54 generally comprises magnetic sensor means and secondary sensor means 56 and 58 generally comprise open circuit means. In addition, inter-connection apparatus 50 comprises securing means, collectively illustrated at 60, which, in the embodiment of FIG. 3, is illustrated as has a hole through which pin 62 passes along the path indicated at 64. Pin 62 is made of a conductive material which closes the electrical connection between open-circuit sensors 56 and 58. Note that sensors 56 and 58 are specifically configured in an open-circuit in order to take advantage of the conductivity properties of pin 62 to electrically complete the connection between the two sensors.

Sensors 54, 56, and 58 are in electrical communication with a control located within or otherwise connected to primary device 52. Said controller functions, in part, to monitor the sensors of the apparatus of the present invention in order to indicate that a secondary device has been attached and that the secondary device has been secured by pin 62. One skilled in the art would readily be able to make, purchase, or otherwise obtain a variety of sensor means already made in electrical communication with a controller connected to primary device 52 which, when said obtained sensors are configured in accordance with the teachings herein, form a composite of the apparatus of the present invention as illustrated generally in FIG. 3. It should be further understood that other embodiments of the present apparatus, in terms of a variety of sensor means, detection means, and securing means, are envisioned herein and are to be considered within the scope of the present invention as taught herein and as claimed.

Attention is now directed to FIG. 4 which illustrates the second half of the inter-connection apparatus of the present invention, shown generally at 70, made integral to secondary device 72 intended to be physically attached to primary device 52 of FIG. 4. As will be discussed further herein, apparatus 70 of FIG. 4 is configured to mate securely with apparatus 50 of FIG. 4.

Apparatus 70 is configured with sensor means 74 which, when brought in close proximity to or in contact with sensor 54 of FIG. 4, enables the controller of primary device 52 to sense that a secondary device is present. It should be understood that sensor means 74 has to be able to provide means for communication with sensor 54 to otherwise complete the circuit there through. Apparatus 70 also is configured with electrical conductivity means shown at 76 and 78 which provide an electrical communication pathway from the outer edge thereof down through to the hole which pin 62 of FIG. 4, shown at 40, so as to come in contact with the conductivity properties of pin 62 such that an electrical circuit is completed there through.

Figure 5:
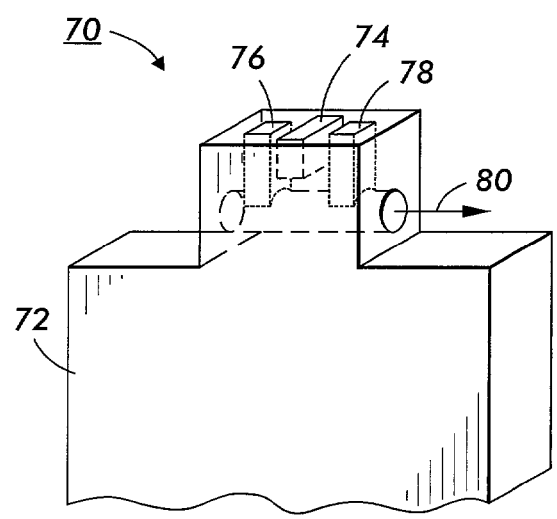
FIG. 5 illustrates a second half of the inter-connection apparatus of the present invention which is made integral to a secondary device intended to be physically attached to primary device 52 of FIG. 4 with said connection pin, further illustrating the addition of sensor 74 for enabling sensor 54 of FIG. 4 to detect the presence of a secondary device.
Figure 6:
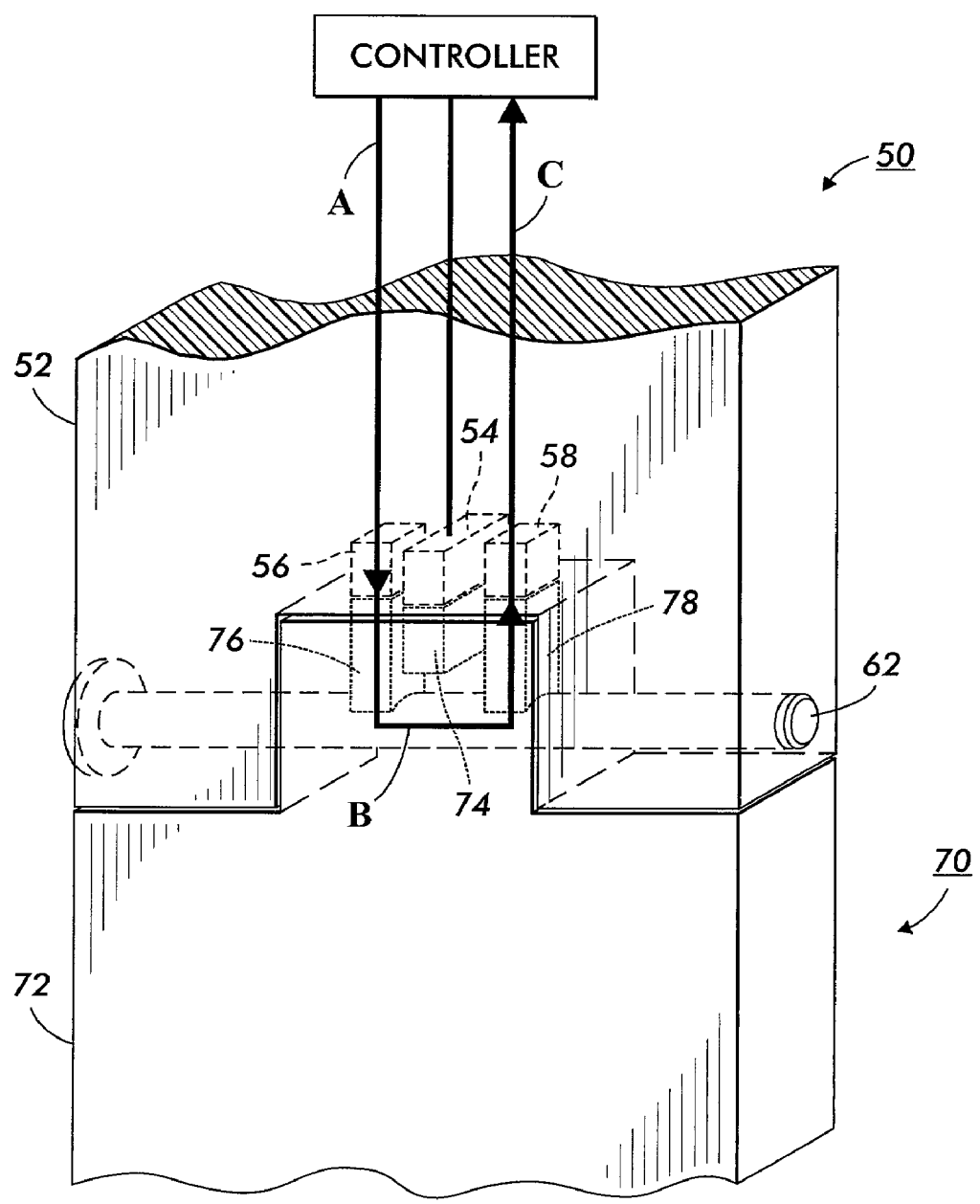
FIG. 6 showing the mating of device 52 of FIG. 4 with device 72 of FIG. 5 also illustrated is pin 62 inserted there between securely physically connecting the two devices together.

Attention is now directed to FIG. 6 which illustrates the mating of device 52 of FIG. 4 with device 72 of FIG. 5. Note that apparatus 70 of FIG. 5 is structurally configured to physically mate with the receiving portion shown in FIG. 4. Securing pin 62 is shown inserted there between through the paths illustrated at 64 in FIG. 4 and at 80 in FIG. 5 thus physically connecting and securing the two devices together. With the physical connection of the two pieces together, sensor means 54 is brought in close proximity to or in physical contact with sensor 74 such that the controller can detect that a secondary device has indeed been attached to the primary device. And, sensors 56 and 58 are brought in electrical communication with conductivity means 76 and 78 respectively. A closed circuit is enabled from path A through electrical conductivity means 76 down to and through electrically conductive pin 62, shown as path B, up through conductivity means 78, passing through the open-circuit sensor means 58 and back to the controller, shown as path C. It is important to understand that the embodiment illustrated herein takes advantage of the conductivity properties of pin 62 to close the circuit along path A to B to C of FIG. 6. In addition, it should be understood that the sensors and conductivity means, are electrically insulated, and thereby isolated from, the bodies of devices 52 and 72.

In summary, what is disclosed is an apparatus comprising two mating portions, a plurality of sensors, and a securing means, with a first mating portion physically attached or integral to a primary device and a second mating portion physically attached or integral to a secondary device both of which are intended to be physically connected there between. The first mating portion generally comprises sensor means for detecting the presence of a secondary device, means for locking the two devices together, and means for detecting that the locking means, which locks the two mating portions together, has been secured. In such a manner, the customer inter-connects a secondary device to a primary device by the mating of the apparatus, and thereafter, inserts the electrically conductive pin through both mating surfaces in order to physically secure the inter-connection there between. A controller is also used for indicating status to an end-user and/or receiving further instructions in the event that the attachment shas not been secured.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A system for securing physical attachment, comprising:
   a first device having a first inter-connection attachment member, said first inter-connection attachment member having a first predefined non-rectangular geometric shape;
   said first inter-connection attachment member including a sensor;
   a second device having a second inter-connection attachment member, said second inter-connection attachment member having a second predefined non-rectangular geometric shape, said second predefined non-rectangular geometric shape and said first predefined non-rectangular geometric shape enabling said second inter-connection attachment member to mate with said first inter-connection attachment member; and
   a securing member engaging said first and second inter-connection attachment members to physically secure the mating of said second inter-connection attachment member with said first inter-connection attachment member;
   said sensor sensing when said securing member has engaged said first and second inter-connection attachment members.

2. The system as claimed in claim 1, wherein said sensor senses a closed electrical circuit.

3. The system as claimed in claim 2, wherein said securing member is conductive material;
   said securing member creating the closed electrical circuit when said securing member has engaged said first and second inter-connection attachment members.

4. The system as claimed in claim 1, wherein said first device includes an indicator, operatively connected to said sensor, to indicate that said securing member has engaged said first and second inter-connection attachment members.

5. The system as claimed in claim 1, wherein said first device includes a controller operatively connected to said sensor.

6. The system as claimed in claim 5, wherein said controller halts operations of said first device when said sensor has sensed that said securing member has not engaged said first and second inter-connection attachment members.

7. The system as claimed in claim 5, wherein said controller halts operations of said second device when said sensor has sensed that said securing member has not engaged said first and second inter-connection attachment members.

8. The system as claimed in claim 5, wherein said controller halts operations of said first and second devices when said sensor has sensed that said securing member has not engaged said first and second inter-connection attachment members.

9. An apparatus for the secure physical attachment of a secondary device to a primary device, comprising:
   a first inter-connection attachment means in physical association with said first device having one predefined non-rectangular geometric shape;
   a second inter-connection attachment means in physical association with said second device, having a second predefined non-rectangular geometric shape wherein said second shape physically mates with said first geometric shape;
   means for securing said physically mated primary and secondary devices;
   means for determining that said first and second inter-connection attachment means are securely mated; and
   controller means for halting at least one of said devices in the event that the attachment there between has not been secured.

10. An apparatus as defined in claim 9 further comprising means for indicating the status of the completion of the secure attachment of said secondary device to said primary device.

11. An apparatus as defined in claim 9 wherein said determining means are associated with both devices and in communication with both device's individual inter-connection attachment means.

12. An apparatus as defined in claim 9 further comprising controller means for receiving additional instructions in the event that said inter-connection has not been secured.

13. A system for securing physical attachment, comprising:
   a first device having a first inter-connection attachment member, said first inter-connection attachment member having a first predefined non-rectangular geometric shape;
   said first inter-connection attachment member including a first sensor and a second sensor;
   a second device having a second inter-connection attachment member, said second inter-connection attachment member having a second predefined non-rectangular geometric shape, said second predefined non-rectangular geometric shape and said first predefined non-rectangular geometric shape enabling said second inter-connection attachment member to mate with said first inter-connection attachment member; and
   a securing member engaging said first and second inter-connection attachment members to physically secure the mating of said second inter-connection attachment member with said first inter-connection attachment member;
   said first sensor sensing when said securing member has engaged said first and second inter-connection attachment members;
   said second sensor sensing when said first device is in close proximity to said second device.

14. The system as claimed in claim 13, wherein said first sensor senses a closed electrical circuit.

15. The system as claimed in claim 14, wherein said securing member is conductive material;
   said securing member creating the closed electrical circuit when said securing member has engaged said first and second inter-connection attachment members.

16. The system as claimed in claim 13, wherein said first device includes an indicator, operatively connected to said first sensor, to indicate that said securing member has engaged said first and second inter-connection attachment members.

17. The system as claimed in claim 13, wherein said first device includes a controller operatively connected to said first sensor.

18. The system as claimed in claim 17, wherein said controller halts operations of said first device when said first sensor has sensed that said securing member has not engaged said first and second inter-connection attachment members.

19. The system as claimed in claim 17, wherein said controller halts operations of said second device when said first sensor has sensed that said securing member has not engaged said first and second inter-connection attachment members.

20. The system as claimed in claim 17, wherein said controller halts operations of said first and second devices when said first sensor has sensed that said securing member has not engaged said first and second inter-connection attachment members.

* * * * *